US008010726B2

(12) United States Patent
Francis

(10) Patent No.: US 8,010,726 B2
(45) Date of Patent: Aug. 30, 2011

(54) DATA PROCESSING APPARATUS AND METHOD FOR HANDLING INTERRUPTS

(75) Inventor: Hedley James Francis, Newmarket (GB)

(73) Assignee: ARM Limited, Cambridge (GB)

( * ) Notice: Subject to any disclaimer, the term of this patent is extended or adjusted under 35 U.S.C. 154(b) by 1250 days.

(21) Appl. No.: 10/788,305

(22) Filed: Mar. 1, 2004

(65) Prior Publication Data

US 2005/0010707 A1    Jan. 13, 2005

(30) Foreign Application Priority Data

Jul. 7, 2003    (GB) ................................ 0315854.0

(51) Int. Cl.
*G06F 13/24*    (2006.01)
*G06F 13/32*    (2006.01)
*G06F 1/12*    (2006.01)

(52) U.S. Cl. .................. 710/266; 710/260; 713/401
(58) Field of Classification Search .................. 710/266; 713/401

See application file for complete search history.

(56) References Cited

U.S. PATENT DOCUMENTS

| | | | |
|---|---|---|---|
| 4,636,770 A | | 1/1987 | Jackson |
| 5,572,686 A * | | 11/1996 | Nunziata et al. .............. 710/116 |
| 5,708,817 A * | | 1/1998 | Ng et al. ........................ 710/266 |
| 5,944,840 A * | | 8/1999 | Lever .............................. 714/34 |
| 6,269,419 B1 * | | 7/2001 | Matsuyama .................... 710/269 |
| 6,298,410 B1 * | | 10/2001 | Jayakumar et al. ............ 710/266 |
| 6,631,434 B1 * | | 10/2003 | Johnson et al. ................ 710/260 |
| 6,934,783 B2 * | | 8/2005 | Muller et al. .................. 710/260 |
| 2002/0069233 A1 * | | 6/2002 | Muller et al. .................. 709/102 |
| 2004/0236534 A1 * | | 11/2004 | Wheless et al. ................ 702/127 |

FOREIGN PATENT DOCUMENTS

| | | |
|---|---|---|
| EP | 1 164 483 A2 | 12/2001 |
| EP | 1 182 549 A2 | 2/2002 |
| GB | 2 360 612 A | 9/2001 |
| JP | 63014261 | 1/1988 |
| JP | 63-211438 | 9/1988 |
| JP | 6075780 | 3/1994 |

OTHER PUBLICATIONS

Ganssle, Jack; "Interrupt Latency"; Embedded.com; Oct. 1, 2001; available online at <http://www.embedded.com>.*

(Continued)

*Primary Examiner* — Ryan M Stiglic
(74) *Attorney, Agent, or Firm* — Nixon & Vanderhye P.C.

(57) ABSTRACT

A data processing apparatus and method for handling interrupts is provided, the apparatus having an interrupt controller operable to receive interrupts generated by a number of interrupt sources, and to determine based on predetermined criteria whether to output an interrupt request signal. A processing unit is provided which is operable upon receipt of the interrupt request signal to perform an interrupt service routine for a selected one of the received interrupts in order to generate an interrupt response for the corresponding interrupt source. Timer logic is also provided which is operable upon receipt of an interrupt generated by an associated interrupt source to produce a timing indication. As a result of this, the processing unit is operable, when performing the interrupt service routine for the interrupt generated by that associated interrupt source, to reference the timer logic in order to obtain the timing indication, and to control a predetermined aspect of the interrupt response in dependence on the timing indication. This has been found to provide a significantly improved technique for handling interrupts from interrupt sources which desire deterministic behavior with regards to the interrupt response.

26 Claims, 6 Drawing Sheets

OTHER PUBLICATIONS

Kamp, Poul-Henning; "Raw data: Interrupt latency measurments"; The FreeBSD Project; Jul. 2, 1998; available online at <http://phk.freebsd.dk/pubs/interruptlatency.pdf>.*

Japanese Official Action dated Jan. 16, 2009 in corresponding Japanese Application No. 2004-117450.

* cited by examiner

DATA PROCESSING APPARATUS AND METHOD FOR HANDLING INTERRUPTS

FIELD OF THE INVENTION

The present invention relates to a data processing apparatus and method for handling interrupts.

BACKGROUND

When devices within a data processing system require a processing unit within the data processing system, typically the CPU, to perform a service routine, they will typically issue an interrupt to that processing unit. When an interrupt is received by the processing unit whilst it is executing a main process, the processing until will typically temporarily interrupt the main process under execution, and instead execute an appropriate Interrupt Service Routine (ISR) in order to handle the interrupt. The devices may be on the same chip as the processing unit, or may be off-chip. In a typical data processing system there will often be multiple devices which can issue such interrupts, and since the processor cannot simultaneously execute the ISRs defined by the plurality of interrupts, it is known to provide an interrupt controller for receiving the various interrupts, and prioritising between them. Hence, interrupts from certain devices (for example a hard disk drive) can be given higher priority than interrupts from other devices (for example a keyboard).

There are a number of sources of delay which can affect the speed at which interrupts are handled within the data processing system. Firstly, as mentioned earlier, the interrupt controller may need to arbitrate between multiple interrupts, and accordingly the handling of some interrupts can be delayed whilst other higher priority interrupts are handled first. Additionally, the speed with which the processing unit can accept the interrupt once it is received by the processing unit, and can hence begin execution of the appropriate ISR, will depend on what instructions are being executed by the processing unit when the interrupt is asserted to the processing unit. Typically the processor will have to complete execution of any instruction that it is currently executing, before it temporarily interrupts that process, and instead executes the ISR. The number of cycles that may be required to complete execution of an instruction will vary, and can be large. For example, if the instruction is a memory accessing instruction then in a worst case scenario it may take several hundred cycles to complete execution of the instruction, as it may be necessary (a) to access very slow memory, (b) to cause a page fault in a virtual memory system which requires a new page walk, etc. In some situations, it may be necessary to complete execution of a group of interrelated instructions before executing the ISR. For example, on an ARM processor this might happen if the group of instructions manually turns off interrupts at the start of the group and re-enables them at the end. This might happen, for example, when updating the configuration of the interrupt controller itself.

In some implementations, it is important for certain devices that may issue interrupts to have reliable behaviour with regards to the timing of the interrupt response generated by the processing unit as a result of handling an interrupt. As an example, manufacturers of hard disk drives are continually seeking to increase the speed of rotation of the disks, and decrease the distance between the tracks, in order to improve access times and improve the density of information which can be stored. Such a disk drive may, for example, issue an interrupt to cause the processing unit to execute an ISR in order to provide some control signals used to control the positioning of the read and write heads. As the speeds at which the disks rotate increase, and the distances between the tracks decrease, it is becoming more important for the interrupt response timing to be managed more carefully.

Another example is in the area of automotive engine control, where the engine management system may issue interrupts periodically in order to cause the processing unit to execute ISRs in order to provide certain critical control information. Again, the timing of the interrupt response can be important.

Whilst the ability to prioritise interrupt requests, so that the interrupt controller can allow high priority interrupts to be forwarded to the processing unit in preference to lower priority ones, assists in ensuring that high priority interrupts are forwarded on to the processing unit at the earliest possible time, the variation in the time taken by the processing unit to actually begin processing the interrupt, depending on what instructions are being executed at the time the interrupt is received, produces a significant amount of variation, also referred to herein as jitter, in the timing of the interrupt response. This jitter can cause errors in the real time control calculations of the devices reliant on the interrupt response, and causes the control to be less accurate. Considering the earlier example of hard disk drives, this jitter can ultimately constrain the degree to which the track widths can be reduced.

Up until now, the only way to seek to alleviate this problem has been to seek to provide mechanisms that reduce the maximum latencies that can be expected with regards to interrupt responses, thereby constraining the jitter. However, this is non-trivial, and tends to place significant constraints on the manner in which instructions are executed by the processing unit, to seek to ensure that no instructions are required to be executed by the processing unit that will take more than a predetermined number of clock cycles to complete, this predetermined number being chosen having regard to the maximum latency allowed with regards to interrupt responses.

Accordingly, it would be desirable to provide an improved technique for constraining the jitter in interrupt response timing when handling interrupts within a data processing apparatus.

SUMMARY

Viewed from a first aspect, the technology described herein provides a data processing apparatus, comprising: an interrupt controller operable to receive interrupts generated by a number of interrupt sources, and to determine based on predetermined criteria whether to output an interrupt request signal; a processing unit operable upon receipt of said interrupt request signal to perform an interrupt service routine for a selected one of the received interrupts in order to generate an interrupt response for the corresponding interrupt source; timer logic operable upon receipt of an interrupt generated by an associated interrupt source to produce a timing indication; the processing unit being operable, when performing the interrupt service routine for the interrupt generated by that associated interrupt source, to reference the timer logic in order to obtain the timing indication, and to control a predetermined aspect of the interrupt response in dependence on the timing indication.

Timer logic is provided which is operable upon receipt of an interrupt generated by an associated interrupt source to produce a timing indication. Hence, by way of illustration, and considering the earlier example, the timer logic may be associated with a hard disk drive, such that when an interrupt is received from the hard disk drive, the timer logic produces a timing indication. The processing unit is then operable, when performing the interrupt service routine for the interrupt generated by that associated interrupt source, to reference the timer logic in order to obtain the timing indication, and to control a predetermined aspect of the interrupt response in dependence on the timing indication.

Whilst prior art techniques have concentrated on reducing the maximum time taken for the processing unit to issue an interrupt response, by in effect seeking to reduce the maximum time taken before the processing unit begins handling of the interrupt, the inventor of the present invention realised that there will always tend to be some variation in the interrupt response timing, due to the inherent variation in the time taken for the processing unit to complete whatever instruction it is in the process of executing at the time the interrupt is received. Accordingly, instead of seeking to concentrate on that particular aspect, the present invention provides an approach whereby a timing indication is produced giving an indication of when the interrupt is received, with this timing indication then being referenced when the processing unit performs the interrupt service routine in order to control a predetermined aspect of the interrupt response. Hence, even though there will still be some variation in the time at which the processing unit can begin performing interrupt service routines, the timing indication can be used to compensate for those variations, and hence provide deterministic behaviour desired by certain devices.

It will be appreciated that the number of interrupt sources which the interrupt controller receives interrupts from may be one or more interrupt sources.

In one example embodiment, the predetermined aspect of the interrupt response controlled in dependence on the timing indication is the time at which the interrupt response is output by the processing unit, whereby the interrupt response is output once a predetermined period of time has elapsed since the interrupt was received by the timer logic.

Hence, in accordance with this embodiment, it can be ensured that the interrupt response is output at some deterministic time after the interrupt is received by the timer logic, and hence at some deterministic time after the interrupt was issued by the interrupt source. As an example, the predetermined time can be chosen to be the longest expected time that will be required for the interrupt response to be available, assuming the maximum allowable latency between issue of the interrupt, and the processing unit beginning to process that interrupt. Although this will mean that some interrupt responses are not made available as soon as they are generated by the processing unit, it does ensure that the interrupt source can be designed in the knowledge that an interrupt response will be available to it some predetermined time after the interrupt is generated. This deterministic behaviour in the timing of the interrupt response enables significant improvements in the accuracy of operation of the device and reduces the need for designing tolerances into the device to allow for jitter in the interrupt response timing.

In an alternative example embodiment, the interrupt service routine comprises an algorithm used to calculate an output forming the interrupt response, the algorithm being arranged to be responsive to the timing indication such that the predetermined aspect of the interrupt response controlled in dependence on the timing indication is the output forming the interrupt response. It will be appreciated that the output can take a variety of forms. For example, the output may comprise one or more values, for example control values for a disk drive device, etc, or may comprise one or more actions, for example a call to a particular subroutine, etc.

In accordance with this example embodiment, the actual output produced as the interrupt response is dependent on the timing indication, and hence takes into account the jitter resulting in the variation in timing between issuance of an interrupt and the handling of that interrupt by the processing unit. Since this jitter is taken into account when producing the interrupt response, this enables the device to be designed without having to incorporate tolerances to take account of such jitter.

It will be appreciated that the timer logic can be provided at any appropriate location within the data processing apparatus. However, in one embodiment, the timer logic is provided within the interrupt controller. Typically, the interrupt can be considered to be received by the interrupt controller as soon as, or very shortly after (for example if the asynchronous interrupt signal is first synchronised with the interrupt controller clock, etc), it is issued by the interrupt source, and hence the timing indication in this embodiment provides an effective indication of the time of generation of the interrupt by the interrupt source.

It will be appreciated that there are a number of ways in which the timer logic can be associated with a particular interrupt source. In one embodiment, this association can be hard-wired into the apparatus, with the timer logic being connected to the connection over which the interrupt is issued by that interrupt source to the interrupt controller. However, in an alternative embodiment, the interrupt source associated with the timer logic may be programmable, thereby allowing selection of the interrupt source that is to be associated with the timer logic.

In one embodiment, multiple interrupt sources are associated with said timer logic, and said timer logic is operable to produce a separate timing indication for each associated interrupt source upon receipt of an interrupt generated by that associated interrupt source. This therefore allows the benefit of the present invention with regards to deterministic behaviour of the interrupt response to be realised in association with multiple interrupt sources within the data processing system. As with the earlier described embodiments, the indication as to which interrupt sources are associated with the timer logic may be hard-wired, or alternatively may be programmable.

It will be appreciated that the timer logic and timing indication may take a variety of forms. In one embodiment, the timer logic comprises a timer that is started when the interrupt is received by the timer logic, the timing indication being the value of the timer when the processing unit references the timer logic during performance of the interrupt service routine. In such an embodiment, it is envisaged that if multiple interrupt sources are associated with the timer logic, the timer logic will have a separate timer for each such associated interrupt source. In embodiments where a timer logic provides such a timer, it can be seen that the processing unit will receive when referencing the timer logic an indication of the time that has elapsed since the interrupt was received by the timer logic.

In an alternative embodiment, the timer logic has access to a global timer, and the timing indication produced by the timer logic is a time stamp value obtained from the global timer at the time the interrupt is received by the timer logic. In this embodiment, there is only a single timer being used, and the processing unit when referencing the timer logic receives a time stamp value indicative of the global time at which the interrupt was received by the timer logic. It will be appreciated that the processing unit will then be able to derive the elapsed time by comparing the current global timer value with the time stamp value provided by the timing indication. This approach has particular benefits when multiple interrupt sources are associated with the timer logic, as it avoids the need for multiple timers to be provided, and hence provides a more cost effective (for example in terms of money, performance and/or power consumption) implementation of the timer logic in such scenarios.

It will be appreciated that the interrupt controller can take a variety of forms. However, in one embodiment, the interrupt controller comprises masking logic operable to allow interrupts from selected interrupt sources to be masked under the control of the processing unit, and the predetermined criteria employed by the interrupt controller to determine whether to output an interrupt request signal comprises a determination as to whether any of the received interrupts have not been masked. Hence, only if at least one of the received interrupts has not been masked by the masking logic will the interrupt controller consider issuing an interrupt request signal to the processing unit. In one embodiment, the interrupt controller may be arranged to automatically issue the interrupt request signal if at least one of the received interrupts has not been masked, whereas in other embodiments, further processing functions may be performed within the interrupt controller before determining whether to issue the interrupt request signal.

For example, in one embodiment, each interrupt has an associated priority level, and the interrupt controller comprises priority encoding logic operable to determine a highest priority unserviced interrupt based on the associated priority levels of the unserviced interrupts, the unserviced interrupts being determined from the interrupts received by the interrupt controller, and the predetermined criteria employed by the interrupt controller to determine whether to output an interrupt request signal comprises a determination as to whether the priority level of that highest priority unserviced interrupt exceeds the priority level of any interrupt that the processing unit is currently performing an interrupt service routine for. Such a priority level assessment can in some embodiments be used in addition to the earlier described masking assessment in order to determine whether to issue an interrupt request signal to the processing unit.

In one embodiment, the timer logic is operable on detection of predetermined criteria to output a signal to the priority encoding logic to cause the priority level of the interrupt generated by the associated interrupt source to be changed to increase the priority of that interrupt. In accordance with this embodiment, the timer logic is used not only to provide a timing indication used to control a predetermined aspect of the interrupt response, but is also in this embodiment selectively used to promote the priority level of the interrupt generated by the associated interrupt source upon detection of the predetermined criteria. It will be appreciated that this may be achieved in a number of ways, for example by increasing the priority level of that interrupt, or by decreasing the priority level of the other interrupts.

It will be appreciated that the predetermined criteria might take a variety of forms. However, one simple predetermined criteria to detect would be when the time elapsed since the timer logic received the interrupt has exceeded a predetermined value. Accordingly, with such an approach, if the processing unit had not started performing the interrupt service routine for that interrupt after that time had elapsed, the timer logic can be arranged to output a signal to the encoding logic to cause the priority of the interrupt to be increased, thereby increasing the likelihood that that interrupt will be the next interrupt to be accepted for handling by the processing unit.

It will be appreciated that the detection of the predetermined criteria within the timer logic may be performed in a variety of ways. For example, in one embodiment, a piece of control logic within the timer logic may be responsible for detecting whether the predetermined criteria has arisen, and to then trigger the necessary output signal from the timer logic to the priority encoding logic.

Typically, it would be appropriate, once the interrupt has been handled, for its associated priority level to be returned to the level that existed prior to it being increased based on the signal from the timer logic. It will be appreciated that there are a variety of ways in which this could be achieved. For example, in one embodiment, the relevant interrupt service routine could include some code towards the end of the routine that causes the priority encoder to reset the priority level to that existing prior to it having been changed based on the signal from the timer logic.

It will be appreciated that when the processing unit receives an interrupt request signal, some determination needs to be made as to the appropriate interrupt service routine to perform in order to handle that interrupt request, the appropriate interrupt service routine being dependent on the interrupt source responsible for the interrupt request. In one embodiment, the selected one of the received interrupts that the processing unit is to perform an interrupt service routine for upon receipt of the interrupt request signal is determined by the interrupt controller, and the interrupt controller further comprises an address generator operable to generate an address for the interrupt service routine to be output to the processing unit with the interrupt request signal. Such embodiments where the interrupt controller determines the interrupt service routine, and issues the address for that interrupt service routine to the processing unit, will be referred to herein as hardware interrupt handling embodiments.

In an alternative embodiment, the selected one of the received interrupts that the processing unit is to perform an interrupt service routine for upon receipt of the interrupt request signal is determined by the processing unit with reference to a status register maintained by the interrupt controller, the status register identifying the interrupt sources from which interrupts have been received. Such embodiments where the decision as to which interrupt service routine to perform is made by the processing unit will be referred to herein as software interrupt handling embodiments.

Viewed from a second aspect, the technology described herein provides a method of handling interrupts in a data processing apparatus, comprising the steps of: (a) receiving interrupts generated by a number of interrupt sources, and determining based on predetermined criteria whether to output an interrupt request signal; (b) upon receipt by timer logic of an interrupt generated by an associated interrupt source, producing a timing indication; (c) upon receipt of said interrupt request signal generated at said step (a), performing an interrupt service routine for a selected one of the received interrupts in order to generate an interrupt response for the corresponding interrupt source; and (d) if at said step (c) the interrupt service routine is being performed for the interrupt generated by the interrupt source associated with the timer logic, referencing the timer logic in order to obtain the timing indication, and controlling a predetermined aspect of the interrupt response in dependence on the timing indication.

DETAILED DESCRIPTION

Figure 1:
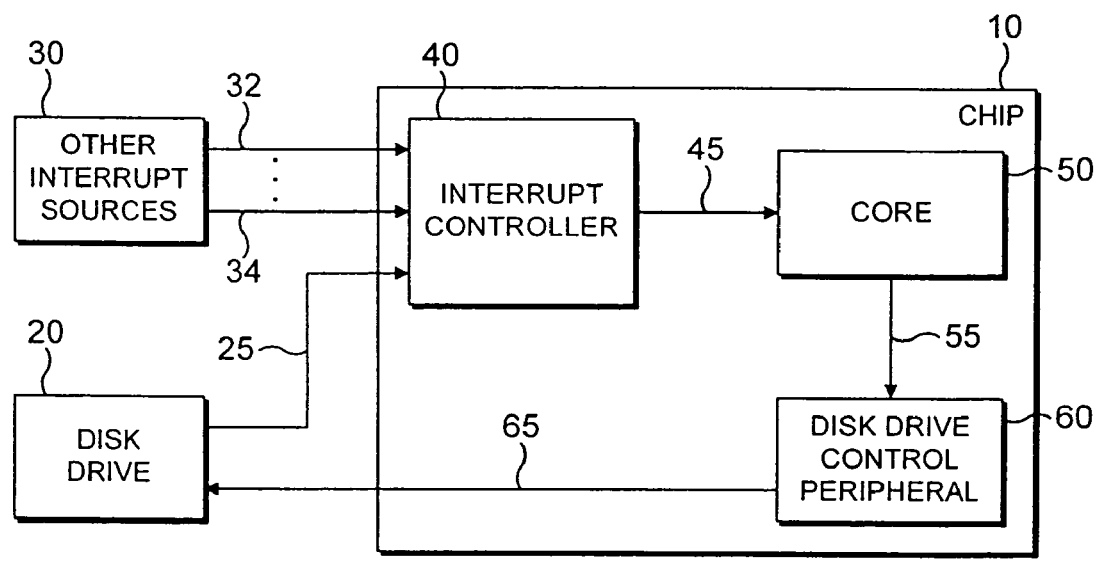
FIG. 1 is a block diagram of a data processing system in which the techniques of an example embodiment may be employed.

FIG. 1 is a block diagram illustrating a data processing system in accordance with one example embodiment, where a disk drive device 20 and various other interrupt sources 30 are connected to a data processing apparatus 10 used to handle interrupts generated by either the disk drive device 20 or the other interrupt sources 30.

The data processing apparatus 10 of the example of FIG. 1 takes the form of a chip, upon which is provided an interrupt controller 40 for receiving the various interrupts issued by either the disk drive device 20 over path 25, or by the other interrupt sources 30 over the multiple interrupt paths 32, 34. Also provided on the chip 10 is a processor core 50 which is responsive to receipt of an interrupt request signal issued by the interrupt controller 40 over path 45 to perform an interrupt service routine (ISR) for one of the interrupts received by the interrupt controller 40 in order to generate an interrupt response for the corresponding interrupt source.

The interrupt response generated by the core will then be routed back to the relevant interrupt source 20, 30 in order to enable that interrupt source to take whatever action is necessary in response to that interrupt response. In the event that the interrupt response is intended for the disk drive device 20, that interrupt response will be output over path 55 from the core 50 to the disk drive control peripheral 60, which is then responsible for outputting the interrupt response over path 65 to the disk drive device 20. In FIG. 1, the disk drive control peripheral 60 is shown as being provided on the chip 10. However, it will be appreciated by those skilled in the art that there is no requirement for the disk drive control peripheral 60 to be provided on-chip, and in alternative embodiments, the disk drive control peripheral 60 may be provided off-chip.

Figure 2A:
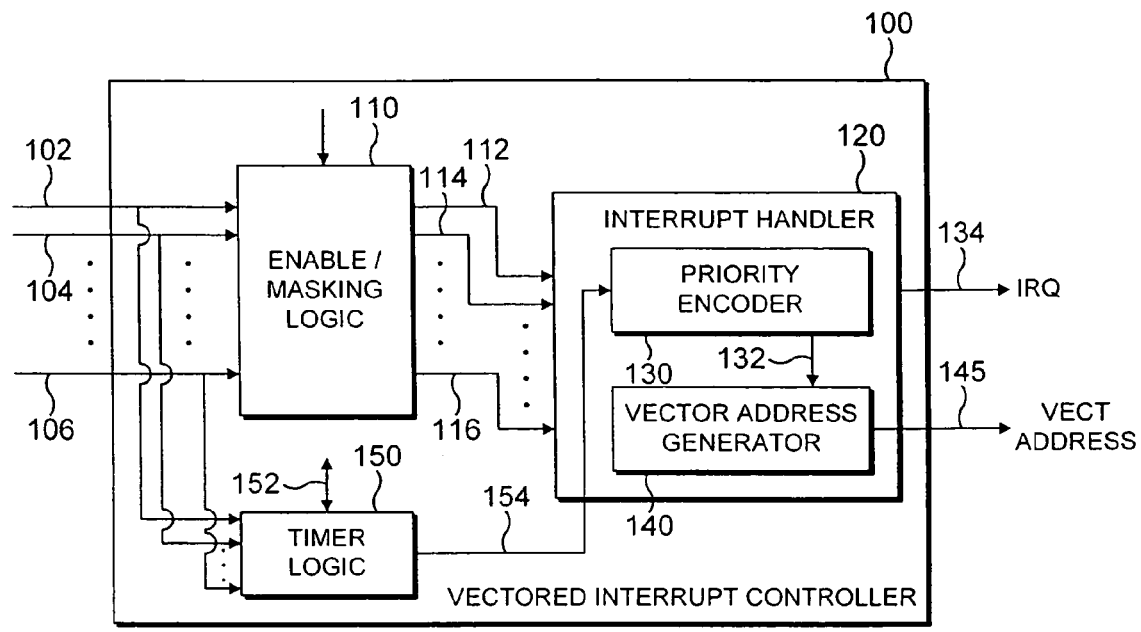
FIG. 2A is a block diagram illustrating in more detail the elements provided within a vectored interrupt controller that may be used as the interrupt controller of FIG. 1.

It will be appreciated by those skilled in the art that the interrupt controller 40 can take a variety of forms. In one embodiment, the interrupt controller 40 includes the logic necessary not only to determine whether an interrupt request signal should be issued to the processor core 50, but also to determine the interrupt service routine that should be performed by the core, such an approach to interrupt handling also being referred to herein as a hardware interrupt handling technique, since the hardware within the interrupt controller itself determines the ISR to be performed. One particular example of such an interrupt controller is illustrated in FIG. 2A, which illustrates a Vectored Interrupt Controller (VIC) 100. In such a VIC, the controller will store a list of vector addresses for ISRs that are associated with each interrupt source. Hence, when an interrupt is received, the VIC can pass the exact location of the associated ISR code to the processor core 50 to enable the processor core to begin execution of that ISR.

More particularly, as shown in FIG. 2A, interrupts received from either the disk drive device 20 or the other interrupt sources 30 are passed over paths 102, 104, 106 to enable/masking logic 110 provided within the VIC 100. The enable/masking logic 110 can be programmed to indicate whether certain interrupt sources are to be enabled or disabled, any interrupts received from disabled interrupt sources being disregarded by the enable/masking logic 110, and accordingly not propagated to the rest of the elements within the VIC 100.

The VIC 100 will also typically keep a record of the priority level of the interrupt currently being handled by the core, with this information being passed to the enable/masking logic 110 to effectively mask any interrupts that are received from interrupt sources having a priority lower than, or the same as, the priority of the currently handled interrupt. The purpose of this is to ensure that, whilst a particular interrupt is being handled by the processor core, the VIC 100 does not propagate to the processor core any other interrupts that have a lower or the same priority as that currently handled interrupt.

Assuming a received interrupt is from an enabled interrupt source, and is not masked by the masking function, then that interrupt will be output to the interrupt handler logic 120 over the relevant path 112, 114, 116. In the presence of any interrupt output by the enable/masking logic 110, the interrupt handler 120 will then output an interrupt request signal (also referred to herein as an IRQ signal) over path 134 to the processor core.

In addition, priority encoding logic 130 within the interrupt handler 120 employs predetermined prioritisation criteria in order to determine which of the potentially multiple interrupts output by the enable/masking logic 110 has the higher priority. Typically, for each possible input to the priority encoder, the priority encoder will have a priority level associated therewith, which may be programmable or may be pre-set. Typically, there will be a range of possible priority levels, and each interrupt source will have associated with it within the priority encoder 130 a priority level within that range.

When the priority encoder 130 has determined the highest priority request from amongst those output by the enable/masking logic 110, it will output a control signal over path 132 to the vector address generator 140 to cause the vector address generator 140 to output a corresponding vector address over path 145. A vector address storage will typically be provided within the vector address generator 140 storing vector addresses corresponding to each of the interrupt sources that may issue interrupts to the VIC 100. Each interrupt source may have a separate vector address specified, or some interrupt sources may share vector addresses (in which case the same interrupt service routine will be shared by those interrupt sources).

In accordance with an example embodiment, the VIC 100 is also provided with timer logic 150 which can have one or more of the interrupt sources associated therewith, and is operable upon receipt of an interrupt issued by an associated interrupt source to produce a timing indication. In the example illustrated in FIG. 2A, the timer logic is shown as receiving the signals from each of the interrupt sources 20, 30, with the timer logic being enabled to be configured over path 152 to indicate which of the interrupt sources are to be associated with the timer logic, and hence for which of the interrupt sources the timer logic is to generate a timing indication. In the embodiment of the invention as illustrated in FIG. 1, it is assumed that the timer logic is to be associated solely with the disk drive device 20, and accordingly assuming as an example that any interrupts issued by the disk drive device 20 are received over path 106, the timer logic 152 will be configured to only respond to interrupts received over path 106.

The timing indication generated by the timer logic 150 can take a variety of forms. In one embodiment, the timer logic 150 is arranged to incorporate a separate timer for each associated interrupt source, such that when an interrupt is received from an associated interrupt source, the corresponding timer is started. In an alternative embodiment, the timer logic 150 may be arranged to provide a time stamp value for any associated interrupt source upon receipt of an interrupt from that interrupt source, the time stamp value being generated with reference to some global timer to which the timer logic 150 has access. This global timer may for example be clocked by the clock of the CPU core 50 to provide a high level of precision, or could be some other form of global timer provided within the data processing apparatus.

The manner in which the timer logic 150 is used in accordance with one example embodiment in order to influence the interrupt response generated when handling an interrupt generated by the disk drive device 20 will now be discussed further with reference to FIG. 3. At step 200, an interrupt is asserted from the disk drive device 20 over path 25, 106, as a result of which the timer logic 150 will start an associated timer at step 205. It will be appreciated that if in an alternative embodiment the timer logic were arranged to produce a time stamp value, then at step 205 the timer logic 150 would, instead of starting a timer, reference the global timer and produce and record a time stamp value for later reference by the core 50.

At step 210, it is then determined whether the received interrupt from the disk drive is a higher priority than the interrupt currently being serviced by the core 50. As discussed earlier, this function is implemented by the enable/masking logic 110 based on priority level information maintained by the VIC 100 and used to control the masking performed by the enable/masking logic 110. If the interrupt is not a higher priority than the currently serviced interrupt, then the process stalls at step 210, until such time that the interrupt is a higher priority than the interrupt currently being serviced. In particular, when the core 50 has completed execution of the ISR for that currently serviced interrupt, the enable/masking logic 110 will typically be caused to clear some of the masking bits, at which point the interrupt from the disk drive 20 may then be a higher priority than the next interrupt scheduled to be handled by the core 50.

When the interrupt is considered at step 210 to be a higher priority than the interrupt currently being serviced by the core, the process proceeds to step 215, where it is determined whether the interrupt is the highest priority unserviced interrupt. The unserviced interrupts can be considered to be those interrupts propagated by the enable/masking logic 110 to the interrupt handler 120 over paths 112, 114, 116. If the interrupt from the disk drive is the highest priority unserviced interrupt, the process proceeds to step 220, whereas otherwise the process returns to step 210.

At step 220, the interrupt handler 120 asserts an interrupt request signal to the core 50 over path 134, and at the same time issues a vector address for the appropriate ISR to the core over path 145.

It will be appreciated that by appropriate prioritisation of the disk drive device 20 with respect to the other interrupt sources 30, the chances of the interrupt from the disk drive 20 experiencing a significant delay at either steps 210 or 215 can be reduced. For example, if the interrupts issued by the disk drive device 20 are considered to be the highest priority interrupts in the system, then it will be appreciated that there should generally be no significant delay experienced by that interrupt at either steps 210 or 215, assuming that the system allows a higher priority interrupt to interrupt an ISR already being executed by the core for a current lower priority interrupt.

However, as already discussed previously, once the interrupt request has been asserted to the core at step 220, the core 50 will need to complete whatever instruction it is in the process of executing at the time, and as different instructions require different numbers of clock cycles to complete, this introduces some jitter into the timing of the interrupt handling process. In particular, whilst the time taken to actually perform the ISR may be very predictable, the time taken between a device asserting the interrupt, and the core being ready to handle the interrupt, can be variable. This jitter can potentially be large. For example, if the instruction being executed at the time is a memory accessing instruction then in a worst case scenario it may take several hundred cycles to complete execution of the instruction, as it may be necessary to access very slow memory. Additionally, if in a virtual memory system the required mapping is not found in the Table Lookaside Buffer (TLB) then a page table walk will have to be performed, which can consist of several additional load operations. Accordingly, at step 225, the process waits until the core is ready to receive the interrupt request, whereafter the core then branches to the ISR at step 230.

Then, in accordance with example embodiments, the core references the timer logic 150 via path 152 during processing of the ISR in order to read the timing indication stored by the timer logic. In the example illustrated in FIG. 3, the core will hence read the value of the timer that exists at the time the core accesses the timer logic 150. This will provide the core with an indication of the time that has lapsed since the interrupt was asserted by the disk drive 20, and this information can be used to influence the generation of the interrupt response by the interrupt source. As will be discussed later with reference to FIGS. 4B and 4C, there are a number of ways in which this "influence" can be achieved.

Once the core has then processed the interrupt service routine, it outputs the interrupt response to the disk drive control peripheral 60 at step 240, whereafter the interrupt is cleared, typically by sending a clear signal back to the disk drive device 20 to tell the disk drive device 20 to stop asserting the interrupt. In addition, the interrupt controller 100 will also typically receive a signal indicating that the ISR has completed, and in addition can be sent a signal to cause the timer within the timer logic 150 to be reset.

In addition to using the timer logic 150 in the above described manner in order to influence the interrupt response, the timer logic 150 can additionally serve a further purpose as will now be discussed with reference to FIG. 2A. As discussed earlier, each of the interrupt sources has associated therewith a priority level, with this information being maintained by the priority encoder 130, and being used in the presence of multiple interrupts to determine which interrupt should be handled by the processing unit next. In an optional implementation of the VIC 100 of FIG. 2A, the timer logic 150 can be provided with a piece of control logic which is operable to detect the occurrence of some predetermined criteria and, in the event of the detection of such predetermined criteria, to issue a signal over path 154 to the priority encoder 130 to cause the priority encoder 130 to modify (typically increase) the priority of the interrupt generated by the associated interrupt source. Preferably, there would be a separate piece of such control logic for each timing indication maintained by the timer logic.

In one embodiment, the predetermined criteria being detected is a point at which the time that has elapsed since the interrupt was received by the timer logic has exceeded some predetermined threshold without that interrupt having been accepted by the processing unit. The VIC 100 will be aware of which interrupt is currently being handled by the processing unit, and hence can provide that information to the control logic within the timer logic 150. In the event that that threshold time has been exceeded, the control logic can then issue a predetermined signal over path 154 to the priority encoder 130, which will trigger the priority encoder 130 to elevate the priority level of the associated interrupt by some predetermined amount, for example by a preset number of priority levels. This will then increase the likelihood that the interrupt will be the next interrupt to be accepted by the processing unit.

It will be appreciated that as a further enhancement the control logic could be used to monitor a number of thresholds, such that as each succeeding threshold elapses, a further control signal can be issued to the priority encoder, so that the priority level of the interrupt can be increased in steps.

When the interrupt has been handled by the processing unit, it will generally be appropriate for the priority level associated with that interrupt to be returned to its former level within the priority encoder 130. It will be appreciated that this can be done in a variety of ways. For example, in one embodiment, when the relevant timing indication in the timer logic is reset, this may cause the control logic within the timer logic 150 to output a further signal over path 154 to the priority encoder 130 to cause the priority level to be reset. In an alternative embodiment, the ISR can be arranged to include some code towards the end of the ISR that is used to instruct the priority encoder 130 to reset the priority level to its former level.

Hence, in accordance with this optional implementation of the VIC 100, the timer logic 150 is used not only to ensure some deterministic behaviour with regards to the interrupt response generated, but also to potentially increase the speed with which the interrupt is handled in certain situations, in particular where handling of the interrupt is being suppressed by the presence of certain higher priority interrupts.

Figure 2B:
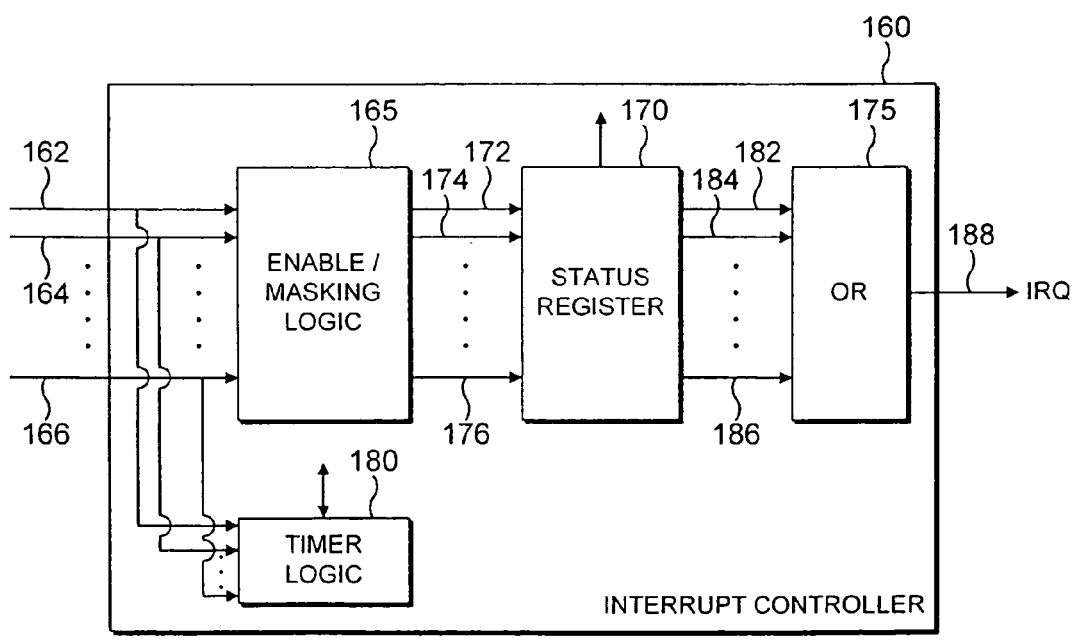
FIG. 2B is a block diagram illustrating an alternative configuration of an interrupt controller that may be used in the data processing system of FIG. 1.

It will be appreciated that the interrupt controller 40 of FIG. 1 need not take the form of the VIC 100 shown in FIG. 2A, but instead could be configured in a number of different ways. FIG. 2B illustrates an alternative configuration of the interrupt controller, in which the interrupt controller is only responsible for asserting the interrupt request to the core, with the core itself then determining which ISR to execute, such an interrupt handling technique also being referred to herein as a software interrupt handling technique, since although the interrupt controller itself is still embodied in hardware, the decision as to which ISR to perform is taken by software executing on the core.

As shown in FIG. 2B, any interrupts received by the interrupt controller 160 over paths 162, 164, 166 are input to enable/masking logic 165, this enable/masking logic 165 operating in an analogous manner to the enable/masking logic 110 described in FIG. 2A. As in the FIG. 2A example, the various interrupts are also routed to the timer logic 180, which operates in an analogous manner to that described earlier with reference to the timer logic 150 of FIG. 2A. Any interrupts that are from an enabled interrupt source, and are not masked by the masking function are then routed from the enable/masking logic 165 onto the status register 170, over paths 172, 174, 176, respectively, the status register being arranged to keep track of the received interrupts propagated on by the enable/masking logic 165. The interrupts received by the status register are also propagated onto the OR gate 175, such that in the presence of any interrupt output by the enable/masking logic 165, the OR gate 175 will output an interrupt request over path 188 to the processor core. When the processor core is ready to receive the interrupt request, it will then access the contents of the status register 170 in order to determine which ISR to execute. For example, if the status register 170 indicates that interrupts have been received from more than one source, the software executing on the core may determine which of those interrupt sources has the highest priority, and hence determine which ISR to execute.

It will be appreciated that in some implementations of such an interrupt controller, a further status register may be provided at the input of the interrupt controller to receive interrupts before they are passed on to the enable/masking logic 165. This status register can be used for a variety of purposes, for example to enable information about when an interrupt has issued to be periodically obtained even if that interrupt has been disabled by the enable/masking logic 165, and hence will not result in that interrupt being handled by the core 50.

Figure 4A:
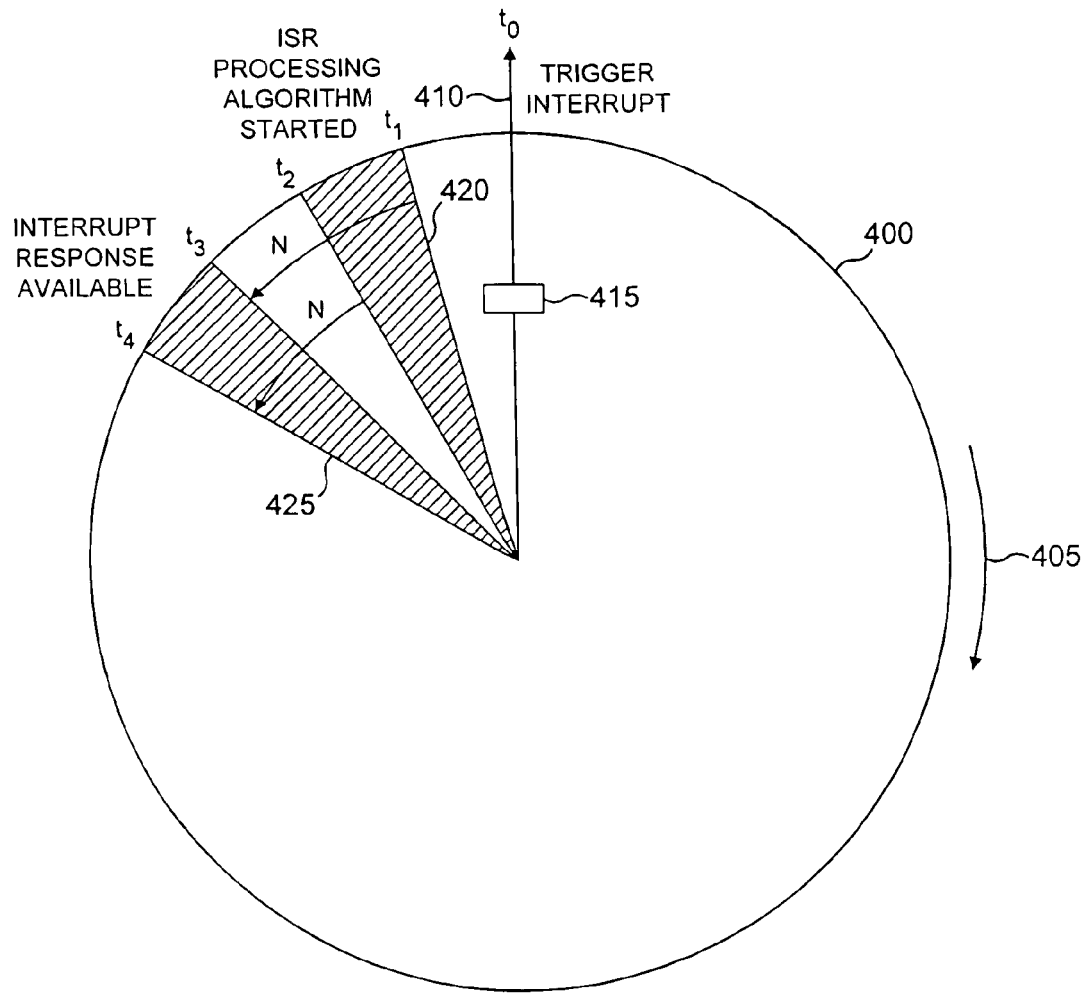
FIG. 4A is a diagram illustrating the timing of interrupt responses to the disk drive in accordance with a prior art technique.

FIG. 4A is a diagram illustrating the problems that may arise when the interrupt response for the disk drive device 20 is generated in accordance with a standard technique that does not employ the timer logic of embodiments of the technology described herein. As shown in FIG. 4A, a disk 400 may be rotated in the direction 405 at high speed, with the data recorded on tracks of that disk being accessed by the read/write heads 415. Periodically, for example upon each revolution of the disk 400, an interrupt 410 may be triggered, in this example this interrupt being considered to have occurred at time $t_0$.

Due to the various delays described earlier with reference to FIG. 3 that may occur prior to the core beginning to execute the required ISR, and in particular the delay that may occur at step 225 of FIG. 3, it will be appreciated that the ISR processing algorithm may be started at any time between times $t_1$ and times $t_2$, this period of time 420 introducing some jitter into the interrupt response timing. If the ISR then takes N clock cycles to execute, it can be seen that this results in the interrupt response being made available to the disk drive device 20 in the period 425 between times $t_3$ and $t_4$. This unknown variation in the time at which the interrupt response can be expected by the disk drive 20 can cause errors in the real time control calculations and may cause the control of the read/write head 415 to be less accurate than desired, resulting in the need, for example, for larger track widths than may be desired.

However, in accordance with example embodiments of the technology described herein, the ISR now has access to the timing indication maintained by the timer logic 150, and this can be used in a variety of ways. For example, in a first embodiment illustrated in FIG. 4B, the core is merely arranged during execution of the ISR to poll the timer maintained by the timer logic until it is determined that that time reaches the maximum latency specified for the system. By this time, the interrupt response will be available, irrespective of whether the ISR was started at time $t_1$, time $t_2$, or any time therebetween, and accordingly irrespective of when the ISR processing algorithm was started, the interrupt response will become available at time $t_4$ 430. This hence ensures that there is a fixed length of time from the interrupt 410 being triggered until the interrupt response is returned to the disk drive device 20, with the ISR processing algorithm being tailored for this fixed delay. Although this means that the interrupt response may be made available to the disk drive 20 later than it could otherwise be made available, it does ensure deterministic behaviour with regards to the timing of the interrupt response, which can enable the disk drive device to be designed without having to build in tolerances to cover the variation in interrupt response timing illustrated earlier with reference to FIG. 4A.

As an alternative, if the ISR processing algorithm is modified so as to be more flexible, then it is possible for this modified ISR algorithm to read the timer value once at some predetermined point during performance of the ISR, and to take the read value into account when determining the interrupt response. This example embodiment is illustrated with reference to FIG. 4C. As can be seen from a comparison of FIG. 4A with FIG. 4C, the timing of the interrupt response is basically the same as in the prior art of FIG. 4A, but now instead of the interrupt response being the same irrespective of the time at which it is issued to the disk drive, the actual interrupt response value will vary dependent on the time it is issued, and hence by way of example the interrupt response will have a different value if it is returned to the disk drive 20 at time $t_3$ than it will have if it is returned to the disk drive 20 at $t_4$. This ensures that more accurate interrupt response values are provided to the disk drive, so again the disk drive can be designed without having to build in tolerances to cope with the inaccuracies in the interrupt response that occurred with the prior art approach illustrated in FIG. 4A.

Figure 3:
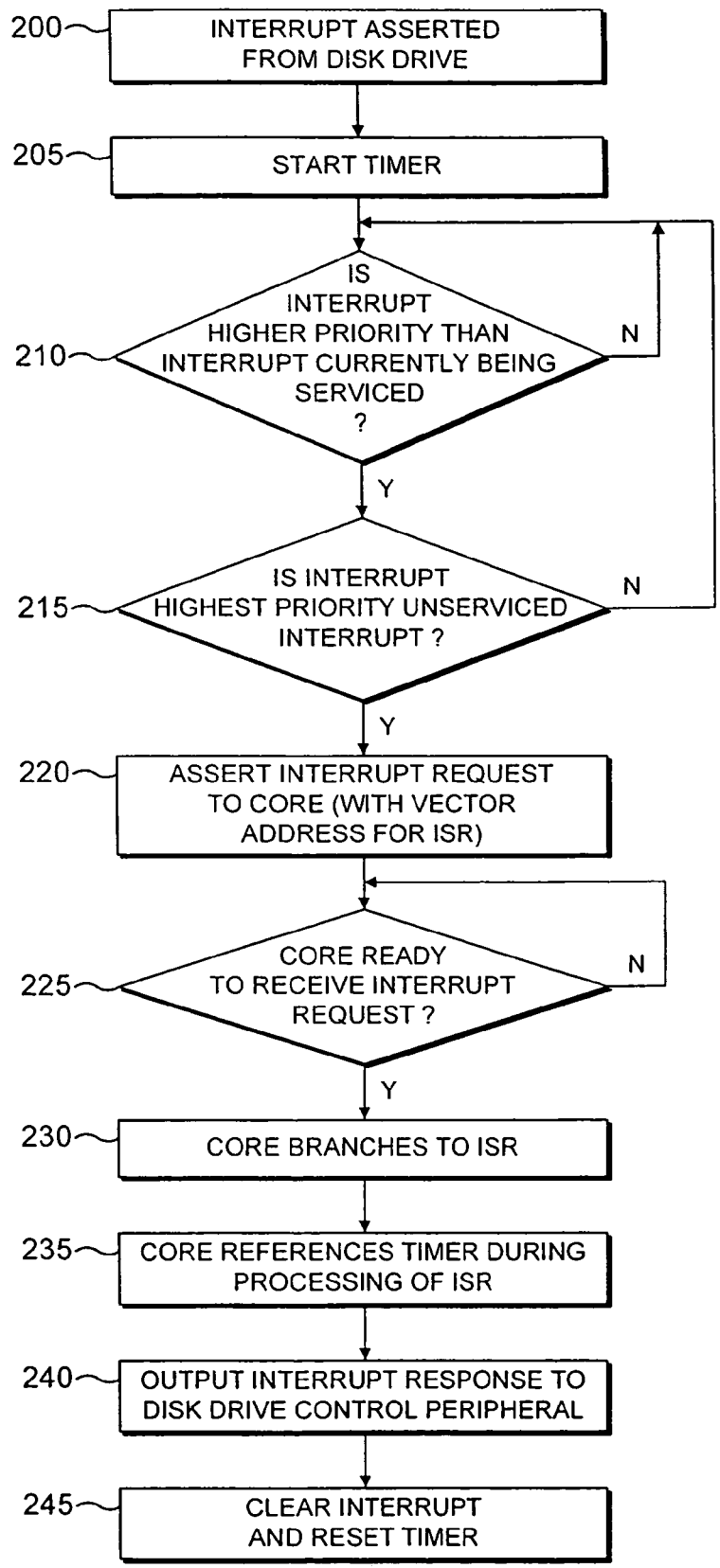
FIG. 3 is a flow diagram illustrating the steps performed by the data processing system of FIG. 1 in order to handle an interrupt asserted by the disk drive in accordance with one example embodiment.
Figure 4B:
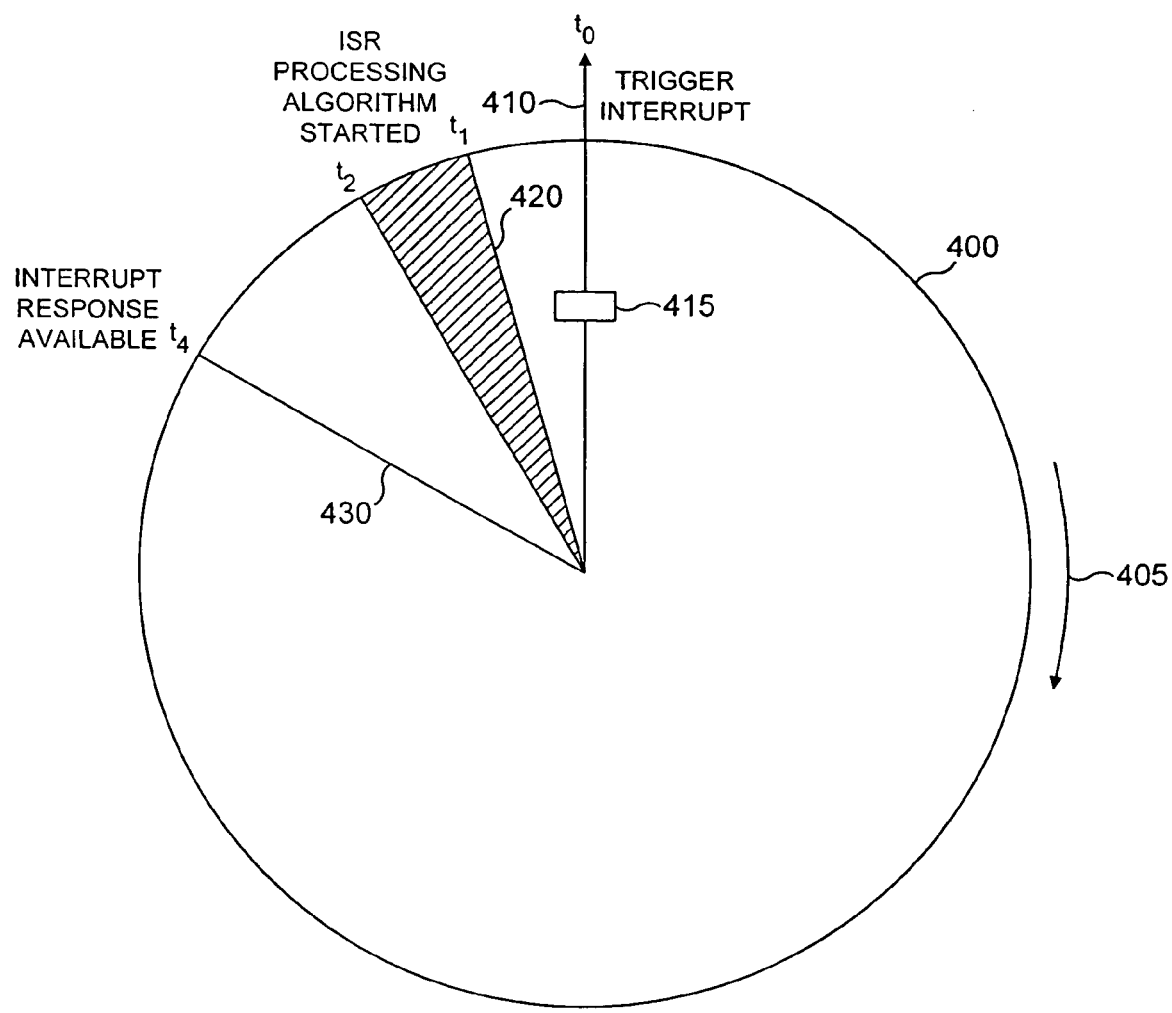
FIGS. 4B and 4C are diagrams illustrating the timing of interrupt responses to the disk drive in accordance with two different example embodiments.
Figure 4C:
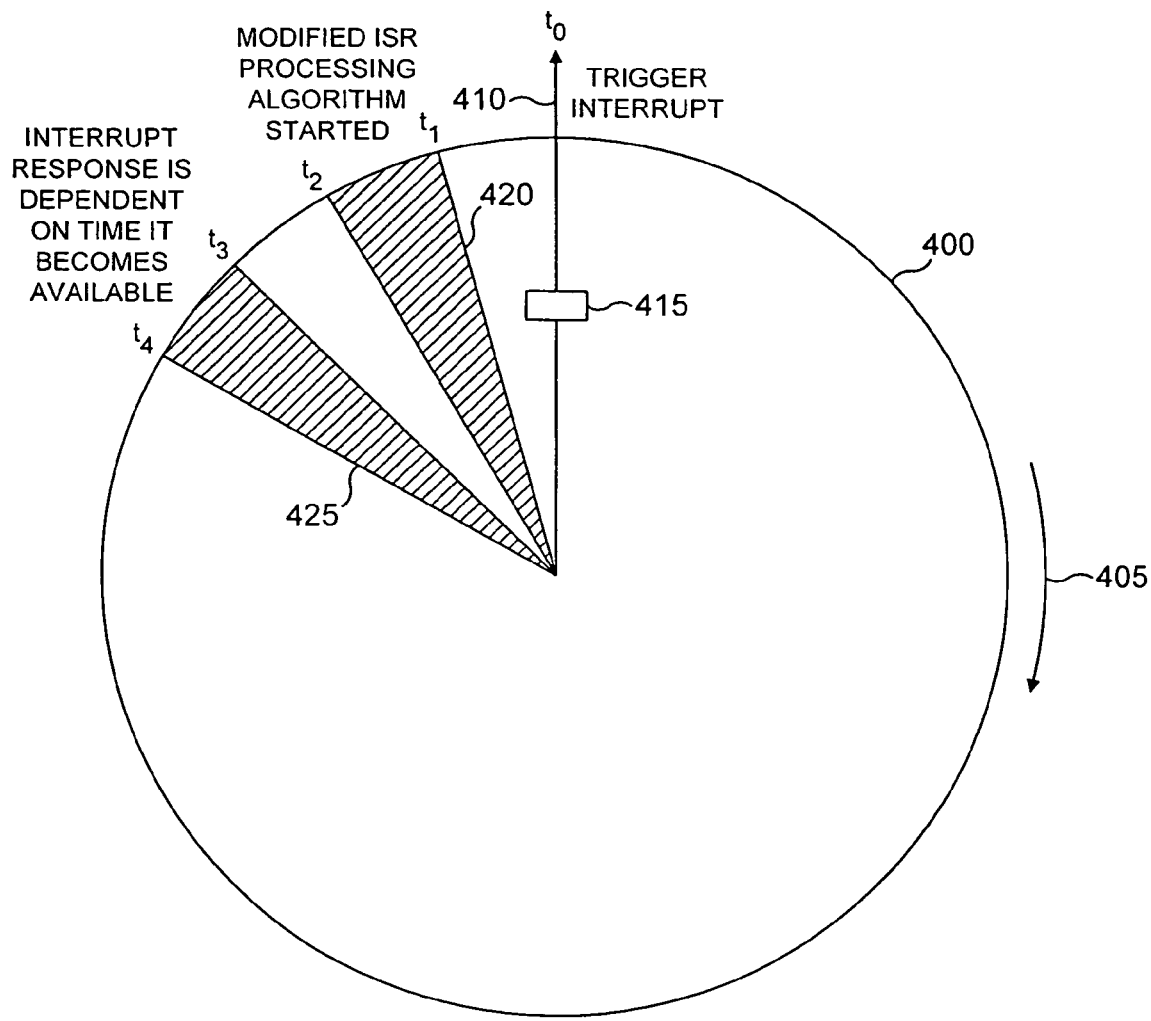

In the earlier discussion of FIG. 3, it was indicated that the timing indication would be reset once the ISR has been completed by the processor core 50. However, it will be appreciated that there are a number of other ways in which the timing indication could be reset. For example, when employing the approach described above with reference to FIG. 4C, where the timing indication is only referenced once during performance of the ISR, it would be possible for the timing indication to be reset at the time it was read by the processor core. Such an approach could also be used if employing the FIG. 4B embodiment, in situations where the timer logic is arranged to provide a time stamp value, rather than a timer, since in that instance it will also only be necessary to read the timing indication once, and instead of polling the timer logic periodically, the processor core would merely need to poll the global timer periodically until it is determined that the elapsed time has reached the maximum latency specified for the system. However, if instead the timer logic itself maintains the timer, and as a result of which when employing the FIG. 4B approach the timer needs to be polled periodically, it would clearly not be appropriate to reset the timer when it is accessed by the processor core 50.

As another alternative, the timer logic could be arranged such that the timing indication is reset when the next interrupt is received from that same associated interrupt source. However, this would only be appropriate if it can be ensured that another interrupt from the same source will not occur until the interrupt service routine for the current interrupt from that source has been performed, or at least until such time that the interrupt service routine no longer needs to reference the timing indication. The above examples are merely intended to illustrate a number of possible ways in which the timing indication can be reset. However, these examples are not intended to represent an exhaustive list, and it will be appreciated that other approaches to resetting the timing indication could also be taken if appropriate, for example by employing a technique where the timer is explicitly reset via a write to a control register for the timer.

From the above description of example embodiments, it will be appreciated that such embodiments provide a significantly improved technique for handling interrupts generated from an interrupt source which desires a high level of deterministic behaviour with regards to the interrupt response. In particular, it enables the problems of jitter being exhibited with regards to the interrupt response to be alleviated, thus alleviating some of the design restrictions that would otherwise be placed upon the design of that interrupt source. Further, the technique alleviates some of the design restrictions on the core 50, in particular alleviating the need to continue to seek to reduce the number of clock cycles taken by an instruction to execute, i.e. reduce the length of time that an instruction is uninterruptible.

Although particular example embodiments have been described herein, it will be appreciated that the claims are not limited thereto and that many modifications and additions thereto may be made.

I claim:

1. A data processing apparatus, comprising:
   an interrupt controller configured to receive interrupts generated by a number of interrupt sources, and to determine based on predetermined criteria whether to output an interrupt request signal;
   a processing unit configured upon receipt of said interrupt request signal to perform an interrupt service routine for a selected one of the received interrupts in order to generate an interrupt response for the corresponding interrupt source;
   timer circuitry configured upon receipt of an interrupt generated by an associated interrupt source to produce a timing indication, wherein said timer circuitry is configured to produce said timing indication before said processing unit begins performance of said interrupt service routine in response to said interrupt request signal;
   the processing unit being configured, when performing the interrupt service routine for the interrupt generated by that associated interrupt source, to reference the timer circuitry in order to obtain the timing indication, and to control a predetermined aspect of the interrupt response in dependence on the timing indication.

2. A data processing apparatus as claimed in claim 1, wherein the predetermined aspect of the interrupt response controlled in dependence on the timing indication is the time at which the interrupt response is output by the processing unit, whereby the interrupt response is output once a predetermined period of time has elapsed since the interrupt was received by the timer circuitry.

3. A data processing apparatus as claimed in claim 1, wherein the interrupt service routine comprises an algorithm used to calculate an output forming the interrupt response, the algorithm being arranged to be responsive to the timing indication such that the predetermined aspect of the interrupt response controlled in dependence on the timing indication is the output forming the interrupt response.

4. A data processing apparatus as claimed in claim 1, wherein the timer circuitry is provided within the interrupt controller.

5. A data processing apparatus as claimed in claim 1, wherein the interrupt source associated with the timer circuitry is programmable.

6. A data processing apparatus as claimed in claim 1, wherein multiple interrupt sources are associated with said timer circuitry, and said timer circuitry is configured to produce a separate timing indication for each associated interrupt source upon receipt of an interrupt generated by that associated interrupt source.

7. A data processing apparatus as claimed in claim 1, wherein the timer circuitry comprises a timer that is started when the interrupt is received by the timer circuitry, the timing indication being the value of the timer when the processing unit references the timer circuitry during performance of the interrupt service routine.

8. A data processing apparatus as claimed in claim 1, wherein the timer circuitry has access to a global timer, and the timing indication produced by the timer circuitry is a time stamp value obtained from the global timer at the time the interrupt is received by the timer circuitry.

9. A data processing apparatus as claimed in claim 1, wherein the interrupt controller comprises masking circuitry configured to allow interrupts from selected interrupt sources to be masked under the control of the processing unit, and the predetermined criteria employed by the interrupt controller to determine whether to output an interrupt request signal comprises a determination as to whether any of the received interrupts have not been masked.

10. A data processing apparatus as claimed in claim 1, wherein each interrupt has an associated priority level, and wherein the interrupt controller comprises priority encoding circuitry configured to determine a highest priority unserviced interrupt based on the associated priority levels of the unserviced interrupts, the unserviced interrupts being determined from the interrupts received by the interrupt controller, and the predetermined criteria employed by the interrupt controller to determine whether to output an interrupt request signal comprises a determination as to whether the priority level of that highest priority unserviced interrupt exceeds the priority level of any interrupt that the processing unit is currently performing an interrupt service routine for.

11. A data processing apparatus as claimed in claim 10, wherein the timer circuitry is configured on detection of predetermined criteria to output a signal to the priority encoding circuitry to cause the priority level of the interrupt generated by the associated interrupt source to be changed to increase the priority of that interrupt.

12. A data processing apparatus as claimed in claim 1, wherein the selected one of the received interrupts that the processing unit is to perform an interrupt service routine for upon receipt of the interrupt request signal is determined by the interrupt controller, and the interrupt controller further comprises an address generator configured to generate an address for the interrupt service routine to be output to the processing unit with the interrupt request signal.

13. A data processing apparatus as claimed in claim 1, wherein the selected one of the received interrupts that the processing unit is to perform an interrupt service routine for upon receipt of the interrupt request signal is determined by the processing unit with reference to a status register maintained by the interrupt controller, the status register identifying the interrupt sources from which interrupts have been received.

14. A method of handling interrupts in a data processing apparatus, comprising the steps of:
 (a) receiving interrupts generated by a number of interrupt sources, and determining based on predetermined criteria whether to output an interrupt request signal;
 (b) upon receipt by timer circuitry of an interrupt generated by an associated interrupt source, producing a timing indication;
 (c) upon receipt of said interrupt request signal generated at said step (a), performing an interrupt service routine for a selected one of the received interrupts in order to generate an interrupt response for the corresponding interrupt source, wherein said timer circuitry produces said timing indication before said processing unit begins performance of said interrupt service routine in response to said interrupt request signal; and
 (d) if at said step (c) the interrupt service routine is being performed for the interrupt generated by the interrupt source associated with the timer circuitry, referencing the timer circuitry in order to obtain the timing indication, and controlling a predetermined aspect of the interrupt response in dependence on the timing indication.

15. A method as claimed in claim 14, wherein the predetermined aspect of the interrupt response controlled in dependence on the timing indication is the time at which the interrupt response is output, whereby the interrupt response is output once a predetermined period of time has elapsed since the interrupt was received by the timer circuitry.

16. A method as claimed in claim 14, wherein the interrupt service routine comprises an algorithm used to calculate an output forming the interrupt response, the method further comprising the step of:
 arranging the algorithm to be responsive to the timing indication such that the predetermined aspect of the interrupt response controlled in dependence on the timing indication is the output forming the interrupt response.

17. A method as claimed in claim 14, wherein the timer circuitry is provided within an interrupt controller.

18. A method as claimed in claim 14, further comprising the step of programming the timer circuitry to identify the interrupt source associated with the timer circuitry.

19. A method as claimed in claim 14, wherein multiple interrupt sources are associated with said timer circuitry, and at said step (b) said timer circuitry is operable to produce a separate timing indication for each associated interrupt source upon receipt of an interrupt generated by that associated interrupt source.

20. A method as claimed in claim 14, wherein the timer circuitry comprises a timer that is started when the interrupt is received by the timer circuitry, the timing indication being the value of the timer when the timer circuitry is referenced during performance of the interrupt service routine at said step (d).

21. A method as claimed in claim 14, wherein the timer circuitry has access to a global timer, and the timing indication produced by the timer circuitry at said step (b) is a time stamp value obtained from the global timer at the time the interrupt is received by the timer circuitry.

22. A method as claimed in claim 14, wherein said step (a) is performed by an interrupt controller comprising masking circuitry allowing interrupts from selected interrupt sources to be masked, and the determination based on predetermined criteria that is performed at said step (a) comprises the step of:
 determining whether any of the received interrupts have not been masked.

23. A method as claimed in claim 14, wherein each interrupt has an associated priority level, and wherein said step (a) is performed by an interrupt controller comprising priority encoding circuitry operable to determine a highest priority unserviced interrupt based on the associated priority levels of the unserviced interrupts, the unserviced interrupts being determined from the interrupts received by the interrupt controller, and the determination based on predetermined criteria that is performed at said step (a) comprises the step of:
 determining whether the priority level of that highest priority unserviced interrupt exceeds the priority level of any interrupt that the data processing apparatus is currently performing an interrupt service routine for.

24. A method as claimed in claim 23, further comprising the steps of:
 on detection of predetermined criteria, causing the timer circuitry to output a signal to the priority encoding circuitry;

the priority encoding circuitry being responsive to the signal from the timer circuitry to change the priority level of the interrupt generated by the associated interrupt source to increase the priority of that interrupt.

25. A method as claimed in claim 14, wherein the selected one of the received interrupts that an interrupt service routine is performed for at said step (c) is determined by an interrupt controller, and the method further comprises the step of:
  causing the interrupt controller to generate an address for the interrupt service routine to be output with the interrupt request signal.

26. A method as claimed in claim 14, further comprising the step of:
  determining the selected one of the received interrupts that an interrupt service routine is to be performed for at said step (c) with reference to a status register maintained by an interrupt controller, the status register identifying the interrupt sources from which interrupts have been received.

* * * * *